US012804061B2

(12) United States Patent
Zhang et al.

(10) Patent No.: US 12,804,061 B2
(45) Date of Patent: Nov. 17, 2026

(54) ROTATING SHAFT MECHANISM AND FOLDABLE MOBILE TERMINAL

(71) Applicant: HONOR DEVICE CO., LTD., Shenzhen (CN)

(72) Inventors: Yaolei Zhang, Shenzhen (CN); Mingqian Gao, Shenzhen (CN); Guotong Zhou, Shenzhen (CN); Yuan Wang, Shenzhen (CN); Haifei Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 121 days.

(21) Appl. No.: 18/255,907

(22) PCT Filed: Sep. 8, 2022

(86) PCT No.: PCT/CN2022/117733

§ 371 (c)(1),
(2) Date: Jun. 5, 2023

(87) PCT Pub. No.: WO2023/051210

PCT Pub. Date: Apr. 6, 2023

(65) Prior Publication Data

US 2024/0080381 A1 Mar. 7, 2024

(30) Foreign Application Priority Data

Sep. 30, 2021 (CN) .......................... 202111163604.4

(51) Int. Cl.

*H04M 1/02* (2006.01)
*G06F 1/16* (2006.01)
*H04W 88/02* (2009.01)

(52) U.S. Cl.

CPC ....... *H04M 1/0216* (2013.01); *H04M 1/0268* (2013.01); *H04W 88/02* (2013.01)

(58) Field of Classification Search

CPC ............................................... H04W 88/00–06

See application file for complete search history.

(56) References Cited

U.S. PATENT DOCUMENTS 10,938,970 B1 3/2021 Lee et al.
11,336,759 B2 5/2022 Liao et al.

(Continued)

FOREIGN PATENT DOCUMENTS

CN 107135288 A 9/2017
CN 206790538 U 12/2017

(Continued)

*Primary Examiner* — San Htun

(74) *Attorney, Agent, or Firm* — Fish & Richardson P.C.

(57) ABSTRACT

Disclosed are a rotating shaft mechanism and a foldable mobile terminal. The rotating shaft mechanism provided in the embodiments of this application is mainly applied to a foldable mobile terminal, so as to implement unfolding and folding of two main body parts of the foldable mobile terminal. When the elastic support member is in a compressed state, at least some segments of the first part and the second part overlap in a floating direction, and the second part provides a compressed deformation space for a part or all of the first part. In this way, a height of the elastic support member in overall compression and deformation is reduced, and an ultra-thin design requirement of the foldable mobile terminal is met.

20 Claims, 9 Drawing Sheets

(56) References Cited

U.S. PATENT DOCUMENTS

| | | | | |
|---|---|---|---|---|
| 2003/0162509 | A1 | 8/2003 | Bae et al. | |
| 2008/0311960 | A1 | 12/2008 | Kim et al. | |
| 2015/0365124 | A1 | 12/2015 | Choi et al. | |
| 2018/0110139 | A1* | 4/2018 | Seo | E05D 1/04 |
| 2021/0181808 | A1* | 6/2021 | Liao | H04M 1/0216 |
| 2021/0286413 | A1* | 9/2021 | Chen | G06F 1/1652 |
| 2021/0303033 | A1* | 9/2021 | Hong | F16C 11/04 |
| 2021/0368032 | A1* | 11/2021 | Liao | G06F 1/1681 |
| 2021/0381289 | A1* | 12/2021 | Hsu | H04M 1/022 |
| 2022/0077352 | A1 | 3/2022 | Huang et al. | |
| 2022/0116489 | A1 | 4/2022 | Nagai et al. | |
| 2022/0311847 | A1 | 9/2022 | Zhao et al. | |
| 2022/0353355 | A1 | 11/2022 | Liao et al. | |
| 2024/0111340 | A1 | 4/2024 | Niu et al. | |

FOREIGN PATENT DOCUMENTS

| | | | |
|---|---|---|---|
| CN | 209375705 | U | 9/2019 |
| CN | 110958337 | A | 4/2020 |
| CN | 111107189 | A | 5/2020 |
| CN | 111698355 | A | 9/2020 |
| CN | 112153178 | A | 12/2020 |
| CN | 112751961 | A | 5/2021 |
| CN | 113141422 | A | 7/2021 |
| CN | 113315860 | A | 8/2021 |
| EP | 3832990 | A1 | 6/2021 |
| WO | 2022055699 | A1 | 3/2022 |

* cited by examiner

ROTATING SHAFT MECHANISM AND FOLDABLE MOBILE TERMINAL

CROSS-REFERENCE TO RELATED APPLICATIONS

This application is a national stage of International Application No. PCT/CN2022/117733 filed on Sep. 8, 2022, which claims priority to Chinese Patent Application No. 202111163604.4, filed on Sep. 30, 2021. The disclosure of the aforementioned applications are hereby incorporated by reference in their entireties.

TECHNICAL FIELD

This application relates to the field of mobile terminal technologies, and in particular, to a rotating shaft mechanism and a foldable mobile terminal.

BACKGROUND

With development of flexible display technologies, foldable mobile terminals have emerged. A foldable mobile terminal usually includes a left housing, a right housing, a rotating shaft mechanism, and a flexible display. The flexible display covers the left housing and the right housing, and both the left housing and the right housing may rotate around the rotating shaft mechanism, so as to be folded together or unfolded.

The current rotating shaft mechanism mainly includes a main support. A swing arm is mounted on both sides of the main support, and the left housing and the right housing are rotatably mounted on both sides of the main support by using corresponding swing arm. In addition, a floating plate and a spring are further disposed on the main support, and are located between the left housing and the right housing. The floating plate and the flexible display are not fixedly connected. In a process of folding or unfolding the left housing and the right housing, the floating plate may move up and down relative to the main support. When the left housing and the right housing are unfolded to an angle of 180 degrees, the floating plate is in a highest position. In this way, the floating plate can support the flexible display corresponding to the floating plate, and the spring is in a compressed state. When the left housing and right housing are folded, the floating plate is usually capable of moving in opposite direction under a restoring force of the spring. In an unfolded state, a space occupied by the floating plate and the spring in a thickness direction of the foldable mobile terminal is an important parameter that restricts the overall thickness of the foldable mobile terminal.

With increasing requirements of users, there is a higher requirement on the thickness of the foldable mobile terminal. How to meet an ultra-thin design requirement of the foldable mobile terminal is a technical problem that persons skilled in the art have been exploring.

SUMMARY

Embodiments of this application provide a rotating shaft mechanism and a foldable mobile terminal, to reduce a thickness of the foldable mobile terminal, so as to meet an ultra-thin design requirement of the foldable mobile terminal.

According to a first aspect, an embodiment of this application provides a rotating shaft mechanism, applied to a foldable mobile terminal, including a main shaft body, a floating plate, and an elastic support member. In a floating direction of the floating plate, the elastic support member includes at least a first part and a second part. When the foldable mobile terminal is in an unfolded state, the floating plate is in a screen supporting position, the elastic support member is compressed between the floating plate and the main shaft body, and the first part is at least partially contracted to a space within a height of the second part. In a process in which the rotating shaft mechanism rotates from the unfolded state to a folded state, the floating plate moves downward, under the action of a restoring force of the elastic support member, until the floating plate moves to a folding setting position. That is, the floating plate can move reciprocally between the folding setting position and the screen supporting position, to provide different unfolding angles of the terminal device. The space within a height in this application refers to a space occupied by the elastic support member in a telescopic direction, and the telescopic direction of the elastic support member is also the floating direction of the floating plate.

When the rotating shaft mechanism is in the unfolded state, at least a part of the first part of the elastic support member is compressed into a space in which the second part is located, that is, the first part and the second part have at least some segments overlapped in the floating direction. The second part provides a compressed deformation space for some or all of the first part. In this way, an overall height of the elastic support member when being compressed and deformed is reduced, and an ultra-thin design requirement of the foldable mobile terminal is met.

Based on the first aspect, an embodiment of this application further provides a first implementation of the first aspect:

The main shaft body includes a shaft cover and a first support, the shaft cover is fixedly connected to at least the first supports at two ends in a length direction of the shaft cover, and there is a cavity between the shaft cover and each first support. The rotating shaft mechanism further includes a connecting member, where a first end of the connecting member is located in the cavity, a second end passes through a channel on the first support to connect the floating plate, and the elastic support member is located in the cavity and can be compressed between the first end of the connecting member and the first support. Both sides of the first support may be rotatably connected to a swing arm assembly, and the two main body parts of the foldable mobile terminal may be connected to the main shaft body by using the swing arm assembly, so as to implement relative folding and unfolding of the two main body parts. The shaft cover protects the components of the rotating shaft mechanism to a certain extent. The elastic support member is mounted between the shaft cover and the first support, and has a compact structure, so that a thickness of the terminal device in an unfolded state can be reduced to a certain extent.

Based on the first implementation of the first aspect, an embodiment of this application further provides a second implementation of the first aspect:

The connecting member further includes a guide shaft segment that cooperates with the channel on the first support to slide, and the guide shaft segment is connected between the first end and the second end. In this way, the guide shaft segment cooperates with the channel on the first support to slide, to guide movement of the floating plate, so as to ensure that the floating plate is in a horizontal state and floats in a predetermined direction. In this way, the floating plate is in contact with the flexible display, to avoid a phenomenon that the floating plate deflects and is partially in contact with the flexible display, and the flexible display is partially under force.

Based on the first aspect or the first implementation of the first aspect, an embodiment of this application further provides a third implementation of the first aspect:

A limiting structure is disposed on at least one of a surface of the first end of the connecting member and a surface of the first support that are opposite to each other, and is configured to limit a maximum radial size of the elastic support member in a compressed state to a predetermined range. In this way, a maximum radial deformation amount of the elastic support member can be controlled, a phenomenon that the elastic support member is excessively deformed and cannot easily restore to an original state is avoided, and deformation of the elastic support member is maintained within a range of elastic deformation of the elastic support member, to protect the elastic support member.

Based on any one of the first to the third implementations of the first aspect, an embodiment of this application further provides a fourth implementation of the first aspect:

The shaft cover is provided with a groove that faces an opening of the connecting member; and when the rotating shaft mechanism is in a folded state, under the action of the restoring force of the elastic support member, a first end of the connecting member abuts against a bottom of the groove, or the floating plate abuts against the first support. In this way, in a case in which a cavity formed between the shaft cover and the first support is as small as possible, a moving space requirement of the floating plate is met. In addition, when the rotating shaft mechanism is in a folded state, under the action of a restoring force of the elastic support member, the floating plate directly abuts against the first support or indirectly abuts against the shaft cover by using a connecting member. This facilitates mounting stability of the floating plate.

Based on any one of the first to the fourth implementations of the first aspect, an embodiment of this application further provides a fifth implementation of the first aspect:

The elastic support member includes a conical spring; and when the rotating shaft mechanism is in the unfolded state, a part of a helical segment of the conical spring is located in an inner cavity enclosed by another part of the helical segment.

Based on any one of the first to the fifth implementations of the first aspect, an embodiment of this application further provides a sixth implementation of the first aspect:

The main shaft body further includes at least one second support fastened to the shaft cover, the second support is located between the two first supports, and a first guide component is disposed on the second support, and is configured to cooperate with a second guide component disposed on the floating plate to provide floating guide.

Based on the sixth implementation of the first aspect, an embodiment of this application further provides a seventh implementation of the first aspect:

One of the first guide component and the second guide component is a guide post, and the other is a guide hole that cooperates with the guide post to slide. The first guide component may be a guide post, or may be a guide hole. Correspondingly, the second guide component is a guide hole or a guide post. Compared with other guide structures, the guide post and the guide hole have a simple cooperation structure, and a space occupied is small.

Based on any one of the first aspect, or the first to the seventh implementations of the first aspect, an embodiment of this application further provides an eighth implementation of the first aspect:

Both sides of the main shaft body are rotatably connected to at least one swing arm assembly, a rotating shaft of each swing arm assembly is parallel to a length direction of the main shaft body, the swing arm assemblies drive the to move when being unfolded around the main shaft body, and the swing arm assemblies can support the floating plate in the screen supporting position. In this way, under support of the swing arm assembly, the floating plate may be stably disposed in the screen supporting position, to stably support the flexible display.

Based on any one of the first to the eighth implementations of the first aspect, an embodiment of this application further provides a ninth implementation of the first aspect:

The first support includes a first connector and a second connector; the first connector and the second connector each are connected to a support part on a side that is close to the shaft cover; the first connector, the second connector, and each support part form an accommodating groove that extends in a length direction of the main shaft body; some segments of the floating plate are floating reciprocally in the accommodating groove; the second end of the connecting member is connected to the floating plate through the support part; the elastic support member can be compressed between the connector and the support part; and the first connector and the second connector each includes a top surface to support the flexible display that is in an unfolded state. The swing arm assembly may be rotatably connected to the first connector and the second connector. A support surface of the flexible display is a horizontal surface, so that when the rotating shaft mechanism is in the unfolded state, top surfaces that are of the first connector, the second connector, and the floating plate and that face the flexible display are coplanar. In this way, a bending part of the flexible display in the unfolded state can be supported on the top surfaces of the first connector, the second connector, and the floating plate, so that a supporting area is large and the bending part of the flexible display is evenly stressed.

According to a second aspect, an embodiment of this application further provides a foldable mobile terminal, including a flexible display and two main body parts, and further including the rotating shaft mechanism according to any one of the first aspect, or the first to ninth embodiments of the first aspect, where the two main body parts are connected by using the rotating shaft mechanism, the flexible display includes a fastening part and a bending part, at least a part of the bending part is opposite to the main shaft body, and the fastening part is fixedly connected to the main body parts. The foldable mobile terminal in this embodiment is provided with the foregoing rotating shaft mechanism. When the foldable mobile terminal is in an unfolded state, a thickness of the foldable mobile terminal at a position of the shaft is relatively thin. This can meet an ultra-thin design requirement of the foldable mobile terminal.

BRIEF DESCRIPTION OF DRAWINGS

To describe technical solutions in embodiments of this application or in the conventional technology more clearly, the following briefly describes accompanying drawings required for describing embodiments or the conventional technology. Apparently, the accompanying drawings in the following description show some embodiments of this invention, and a person of ordinary skill in the art may still derive other drawings from these accompanying drawings without creative efforts.

DESCRIPTION OF EMBODIMENTS

The foldable mobile terminal provided in embodiments of this application may be a foldable mobile terminal product including a flexible display, such as a mobile phone, a tablet, a wearable device, an in-vehicle device, an augmented reality (augmented reality, AR)/virtual reality (virtual reality, VR) device, a laptop computer, an ultra-mobile personal computer (ultra-mobile personal computer, UMPC), a netbook, or a personal digital assistant (personal digital assistant, PDA). A specific type of the electronic device is not limited in embodiments of this application.

To describe technical solutions briefly, in this application, the following orientation terms are defined: A position near a center line of the rotating shaft mechanism 300 is defined as "internal", and correspondingly, two sides that are away from the center line are defined as "external"; and when the foldable mobile terminal is in an unfolded state, a direction near the user is defined as "front", and correspondingly, a direction that is away from the user is defined as "back".

Figure 1:
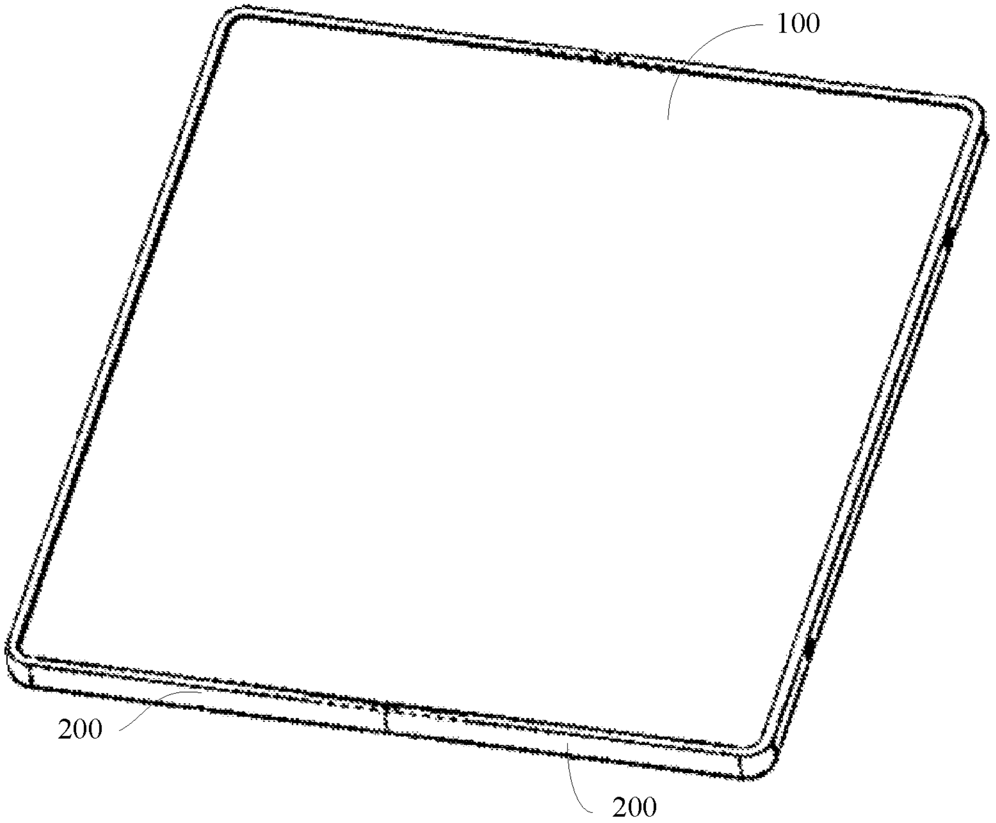
FIG. 1 is a three-dimensional schematic diagram of a foldable mobile terminal according to an embodiment of this application.
Figure 2:
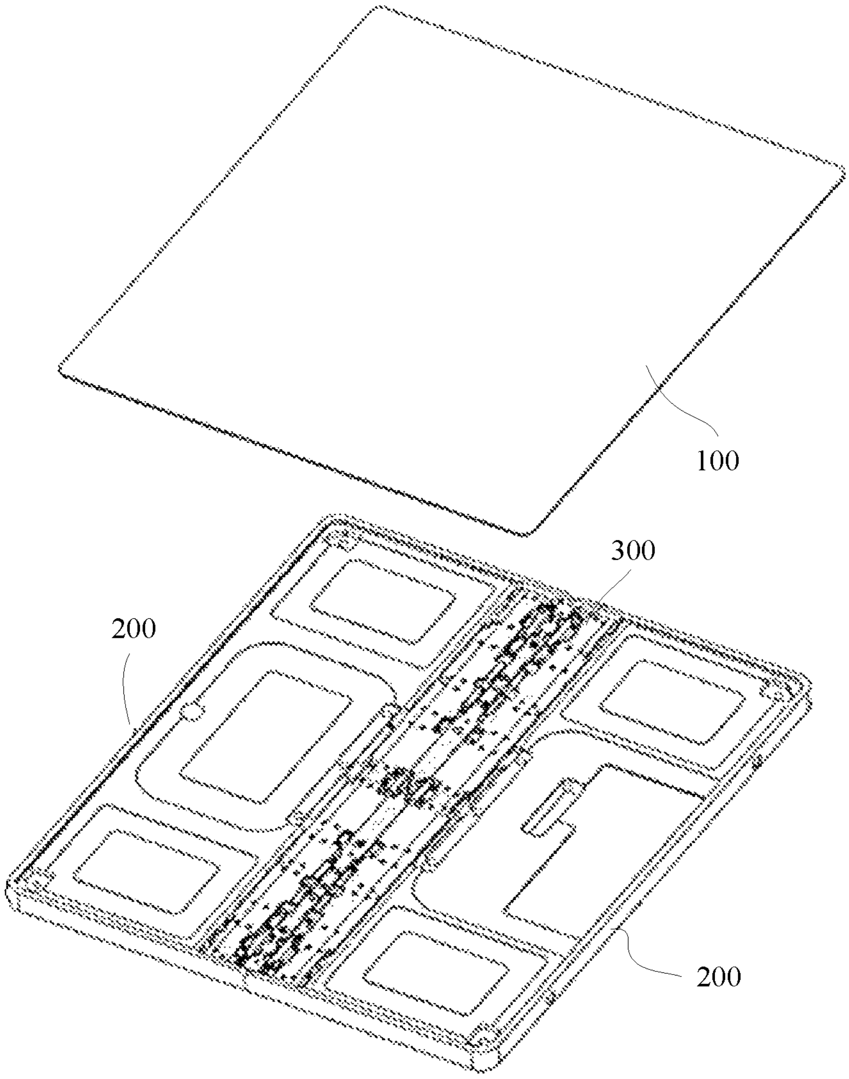
FIG. 2 is a schematic exploded view of the foldable mobile terminal shown in FIG. 1.

Refer to FIG. 1 and FIG. 2. In this embodiment, the foldable mobile terminal includes a rotating shaft mechanism 300, two main body parts 200, and a flexible display 100. The two main body parts 200 of the foldable mobile terminal are connected by using the rotating shaft mechanism 300, and the two main body parts 200 are rotated relative to each other by using the rotating shaft mechanism 300, so as to implement folding and unfolding of the foldable mobile terminal. Structures of the two main body parts 200 may be the same, or may not be completely the same. Specific structures of the two main body parts 200 may be determined based on a specific product, and are not specifically limited in this specification.

Figure 3:
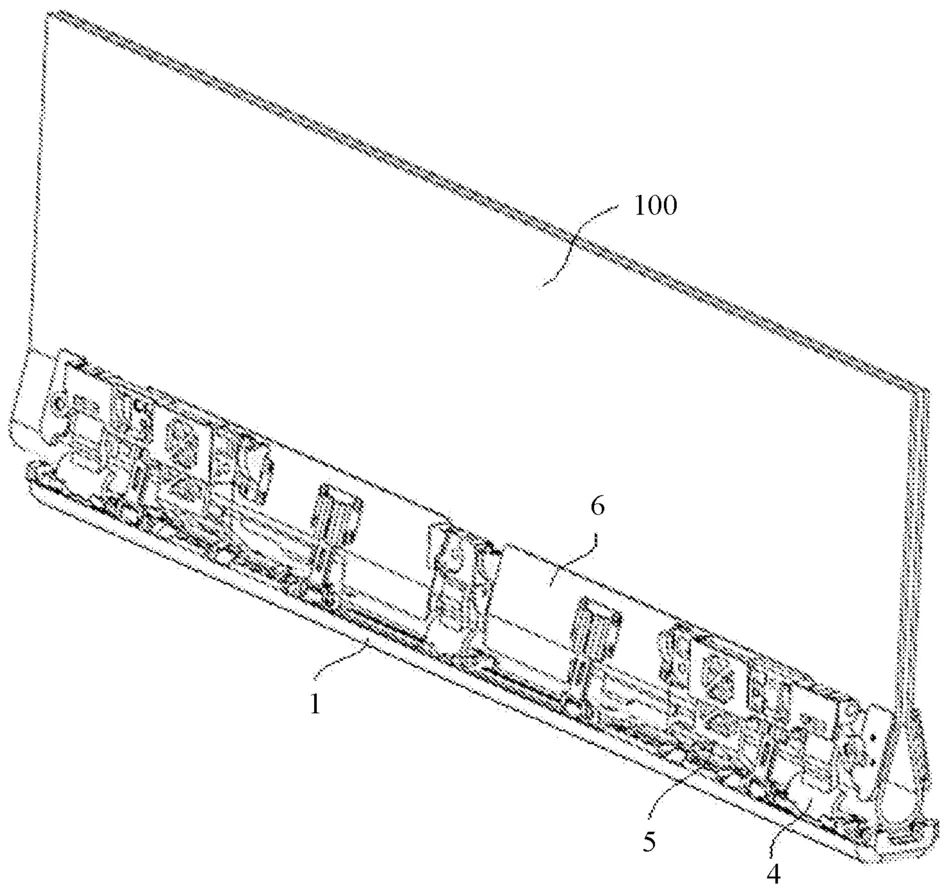
FIG. 3 is a schematic diagram of a rotating shaft mechanism and a flexible display in a folded state according to an embodiment of this application.

In this embodiment, the flexible display 100 includes two fastening parts and one bending part. The two fastening parts can be combined with and fastened to the two main body parts 200. The bending part is disposed opposite to the main shaft body of the rotating shaft mechanism 300, and the bending part is not fastened to the main shaft body of the rotating shaft mechanism 300, so as to meet a bending deformation requirement of the bending part during folding. When the foldable mobile terminal is in a folded state, the bending part can be curved in an arc shape. As shown in FIG. 3, in a closed state, the bending part of the flexible display 100 is bent into a waterdrop shape. In this way, an R angle of the screen is large enough to avoid a large degree of bending, while the fastening parts on both sides can fit well with no gap, and a bending trace is minimized. Certainly, when the flexible display 100 is in a folded state, a folding shape of the bending part may be not limited to the waterdrop shape described in this specification, or may be in another form.

The flexible display 100 includes a display module and a transparent cover. The display module can display an image, a video, and the like. The display module may be a liquid crystal display (liquid crystal display, LCD), an organic light emitting diode (organic light-emitting diode, OLED), an active matrix organic light emitting diode (active-matrix organic light emitting diode, AMOLED), a flexible light emitting diode (flex light-emitting diode, FLED), a Miniled, a MicroLed, a Micro-OLED, a quantum dot light emitting diode (quantum dot light emitting diodes, QLED), or the like. The transparent cover covers an outer side of the display module to protect the display module. The transparent cover plate may be a glass cover plate, or may be another transparent material that can provide a protection function. The flexible display 100 may further have a touch function, that is, the flexible display 100 may be a touchscreen.

Refer to FIG. 3 to FIG. 9. In this embodiment, the rotating shaft mechanism 300 includes a shaft cover 1, a floating plate 2, a conical spring 3, a first support 7, a second support 8, and a swing arm assembly. A cross section of the shaft cover 1 is approximately a U-shaped structure, a quantity of the first supports 7 and a quantity of the second supports 8 each is at least one, and the first support 7 is located at an end of the shaft cover 1. Each first support 7 and each second support 8 are mounted at an opening of the shaft cover 1. The shaft cover 1, the first support 7, and the second support 8 form a main shaft body, and provide a mounting base for each component of the rotating shaft mechanism 300. Other components in the rotating shaft mechanism 300 are basically mounted on an inner side of the shaft cover 1, and the shaft cover 1 is equivalent to a housing of the rotating shaft mechanism 300 to a certain extent. By properly setting an outer surface shape of the shaft cover 1, a beautiful outlook of the foldable mobile terminal may be formed together with the main body part 200.

Figure 4:
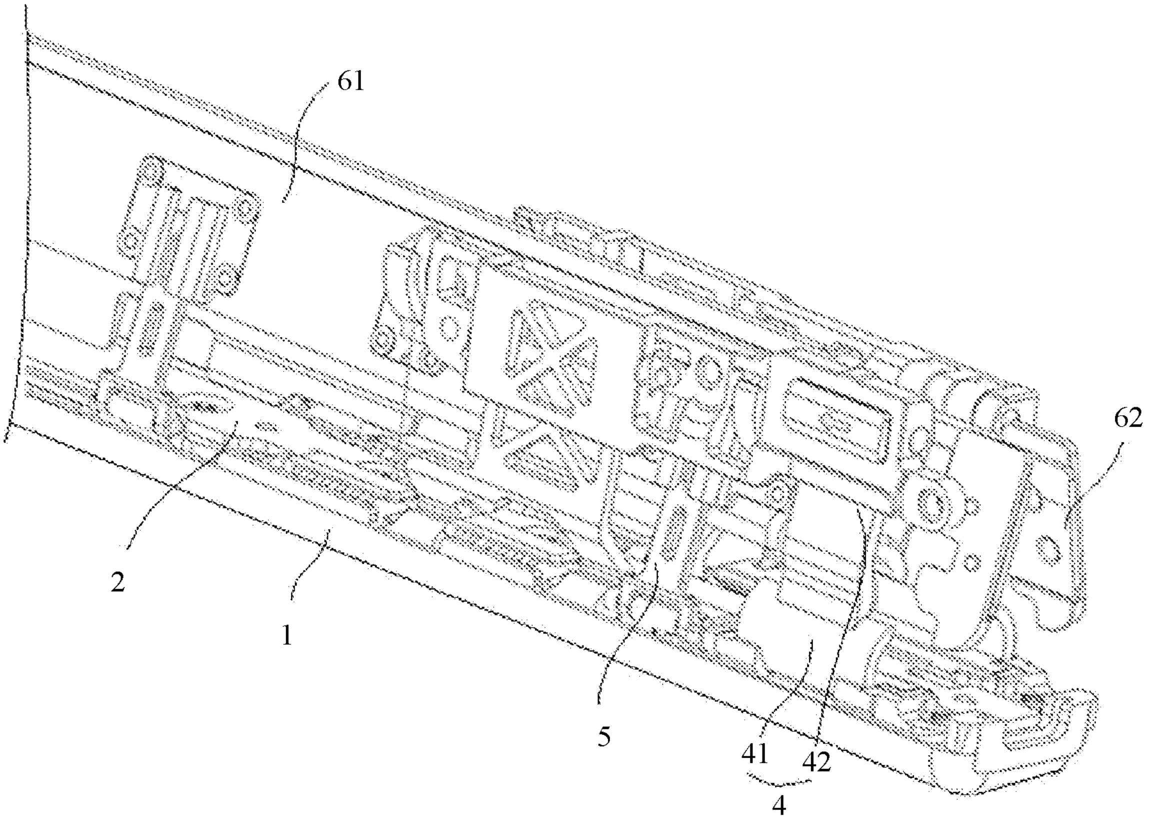
FIG. 4 is a partial schematic diagram of a rotating shaft mechanism according to an embodiment of this application.
Figure 5:
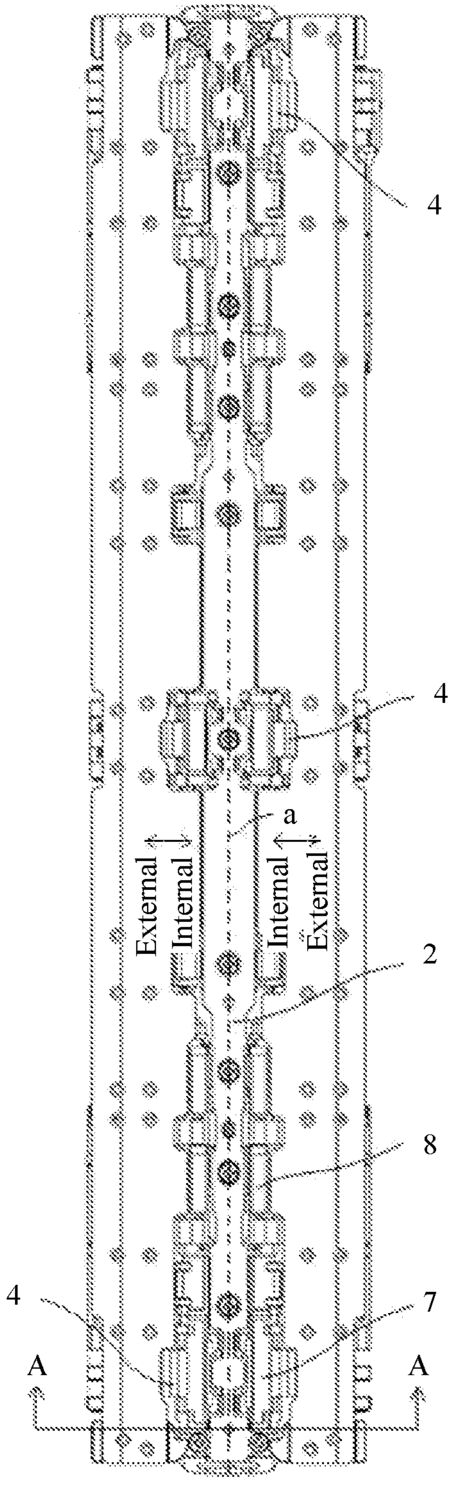
FIG. 5 is a top view of a rotating shaft mechanism in an unfolded state according to an embodiment of this application, and a three-dimensional schematic diagram of a cross section of a position of a connecting pin of a rotating shaft mechanism according to an embodiment of this application.
Figure 6:
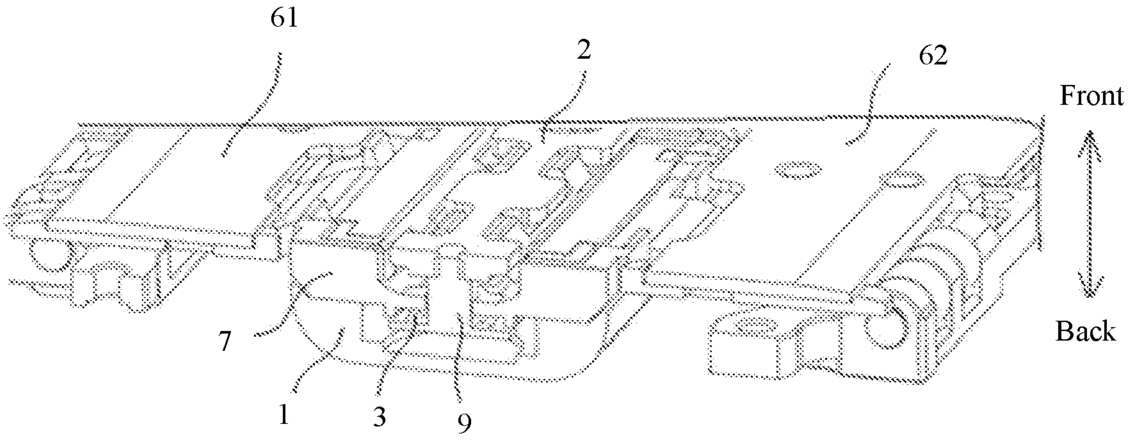
FIG. 6 is a partial view of a sectional view taken along A-A in FIG. 5.

In this embodiment, the rotating shaft mechanism 300 further includes a swing arm assembly. The swing arm assembly may include at least one main swing arm 4 and at least one auxiliary swing arm 5. An inner end of the main swing arm 4 and an inner end of the auxiliary swing arm 5 are respectively rotatably connected to the first support 7 and the second support 8. An outer end 42 of the main swing arm 4 is hinged or pivotally connected to a connecting plate 6. Refer to FIG. 5 and FIG. 6. A first connecting plate 61 and a second connecting plate 62 are respectively connected to both sides of the main shaft body by using the main swing arm 4 on the corresponding side, and the first connecting plate 61 and the second connecting plate 62 can move reciprocally between a folding position and an unfolding position with the main swing arm 4. The auxiliary swing arm 5 mainly provides guiding function in a process in which each connecting plate rotates around the main shaft body, and an outer end of the auxiliary swing arm 5 is slidably connected to a corresponding side connecting plate. That is, a sliding groove may be disposed on a side surface of the connecting plate that faces the auxiliary swing arm 5, and a part of the auxiliary swing arm 5 is slidably disposed in the sliding groove. For cooperation between the auxiliary swing arm 5 and the sliding groove, refer to FIG. 4. Specific structures of the sliding groove, the main swing arm 4, and the auxiliary swing arm 5 are not specifically limited in this specification.

The first connecting plate 61 and the second connecting plate 62 are respectively connected and fastened to two main body parts 200. For a manner of connecting the first connecting plate 61 and the second connecting plate 62 to the two main body parts 200, refer to the conventional technology. Details are not described in this specification. In this embodiment, a front surface of the first connecting plate 61 and a front surface of the second connecting plate 62 are fixedly connected to a part of the fastening part of the flexible display 100, and both the first connecting plate 61 and the second connecting plate 62 may be fixedly connected to the flexible display 100 by using an adhesive. In addition, sizes of the first connecting plate 61 and the second connecting plate 62 are not limited in this specification, provided that a use requirement can be met.

In this embodiment, the main swing arm 4 is rotatably connected to the first support 7, and the auxiliary swing arm 5 is rotatably connected to the second support 8. Because the main swing arm 4 and the auxiliary swing arm 5 are slightly different in function, the rotatable connection manner between the main swing arm 4 and the first support 7, and the rotatable connection manner between the auxiliary swing arm 5 and the second support 8 may be different. Refer to FIG. 4. In this embodiment, an inner end of the main swing arm 4 includes a semi-circular arc-shaped segment 41, and the semi-circular arc-shaped segment 41 rotates and cooperates with an arc-shaped surface of the support to rotate. The inner end of the auxiliary swing arm 5 is hinged to the second support 8.

That the first support 7 and the second support 8 are two parts of the support that are disposed in different positions in the rotating shaft mechanism 300 is merely used for briefly describing the technical solutions. The first support 7 and the second support 8 may be in an integrated structure, or may be in a split structure. The following continues to describe technical solutions and technical effects by using the example that the first support 7 and the second support 8 are in a split structure as an example.

Figure 8:
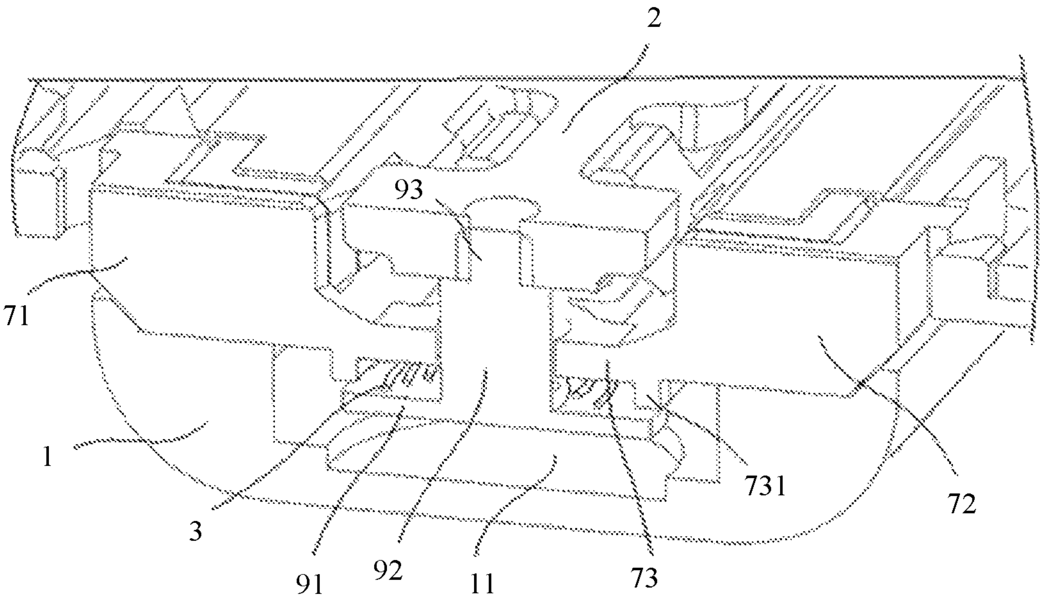
FIG. 8 is a partially enlarged view of FIG. 5.

Further with reference to FIG. 8, in this embodiment, the conical spring 3 is mounted between the first support 7 and the floating plate 2 by using the connecting pin 9. In a telescopic direction, an outer contour size of a cross section of the conical spring 3 gradually changes. For example, the outer contour size of the cross section may be increased or decreased in a direction from the flexible display 100 to the shaft cover 1 (that is, in a front-to-back direction). Using the conical spring 3 is a cone spring as an example, an outer contour size of a cross section of the cone spring is circular, and a radius of the cross section of the conical spring 3 may gradually increase or decrease in the direction from the flexible display 100 to the shaft cover 1. It should be noted that, in this application, a plane perpendicular to a floating direction is defined as a cross section. In a process in which the rotating shaft mechanism 300 is gradually unfolded from the folded state, when rotating, the main swing arm 4 or the auxiliary swing arm 5 can drive the floating plate 2 to move toward the flexible display 100, and finally support the floating plate 2 in the screen supporting position. In this case, the floating plate 2 is in contact with the bending part of the flexible display 100 to support the bending part of the flexible display 100. In addition, the conical spring 3 is compressed between the first end of the connecting pin 9 and the support, and a pulling force toward the shaft cover 1 is generated on the floating plate 2. When the rotating shaft mechanism 300 rotates reversely, that is, gradually rotates from the unfolded state to the folded state, an inner end of the main swing arm 4 gradually disengages from the floating plate 2, and the floating plate 2 moves toward the shaft cover 1 under the action of a restoring force of the conical spring 3, so as to avoid bending and deformation of the flexible display 100.

Figure 11:
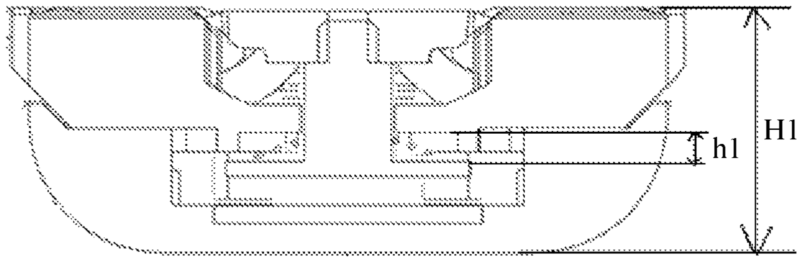
FIG. 11 is a schematic diagram of an overall thickness of a rotating shaft mechanism when a rotating shaft mechanism with a conical spring is in an unfolded state according to an embodiment of this application.
Figure 12:
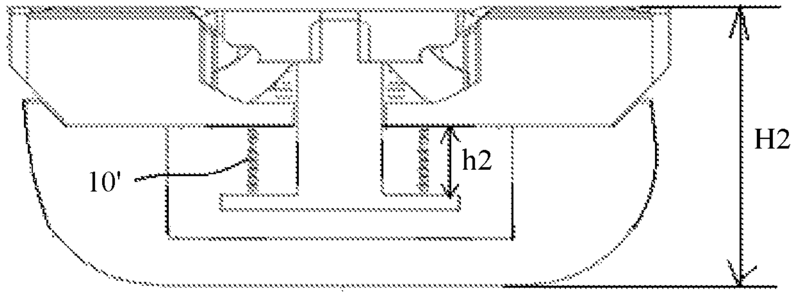
FIG. 12 is a schematic diagram of an overall thickness of a rotating shaft mechanism when a rotating shaft mechanism with a cylindrically helical spring is in an unfolded state.

In this embodiment, when the rotating shaft mechanism 300 is in the unfolded state, a part of the helical segment of the conical spring 3 compressed between the first support 7 and the first end of the connecting pin 9 is located in an inner cavity enclosed by the other part of the helical segment. That is, in a compression process of the conical spring 3, a helical segment with a smaller diameter may exert a transverse force on an adjacent helical segment with a larger diameter, so that the helical segment with the larger diameter also deforms in a horizontal direction. In this way, the helical segment with a smaller diameter may be compressed to an inner space of the helical segment with a larger diameter, so as to reduce a compression height of the conical spring 3. In this way, when the same restoring force is generated, compared with the cylindrically helical spring compression parts arranged in the floating direction in sequence, in this embodiment, a height space occupied by the conical spring 3 after being compressed is small, and a thickness of the rotating shaft mechanism 300 after being unfolded by the foldable mobile terminal is also small, so that the ultra-thin design requirement of the foldable electronic device is met. Refer to FIG. 11 and FIG. 12. FIG. 11 shows a height h1 obtained after the conical spring 3 is compressed and deformed. FIG. 12 shows a height h2 obtained after the cylindrically helical spring is compressed and deformed. It is clear that, after the conical spring 3 and the cylindrically helical spring 10' of a same height in an initial state reach a respective maximum compression amount, a height of the conical spring 3 is less than a height of the cylindrically helical spring 10'. That is, a rotating shaft mechanism 300 of the conical spring 3 requires a small space in the floating direction, and a thickness H1 of the rotating shaft mechanism 300 with the conical spring 3 is less than a thickness H2 of the rotating shaft mechanism 300 with the cylindrically helical spring.

Refer to FIG. 5 to FIG. 7 again. In this embodiment, there is a cavity between the shaft cover 1 and the first support 7. The first end of the connecting pin 9 is located in the cavity, and a second end passes through a channel on the support to connect the floating plate 2. A protrusion that protrudes toward the shaft cover 1 may be disposed at a position at which the floating plate 2 is connected to the connecting pin 9. This can increase partial thickness of the position at which the floating plate 2 is connected, and enhance strength during use. The conical spring 3 is mounted between the first end of the connecting pin 9 and the first support 7. When the floating plate 2 is driven by the main swing arm 4 to move in the direction of the flexible display 100, the connecting pin 9 also moves with the floating plate 2 in the direction of the flexible display 100, and the conical spring 3 is compressed between the first end of the connecting pin 9 and the first support 7.

In this embodiment, the first end of the connecting pin 9 may include a support surface facing the first support 7, a lower end of the conical spring 3 is supported on the support surface, and an upper end abuts against a bottom wall of the first support 7. The connecting pin 9 and the floating plate 2 may be connected by using a thread, or may be connected and fastened by using an adhesive process or through interference fit. The support surface may be a plane, or may be a structure of a curved surface, for example, a spherical surface, provided that a stable support for the conical spring 3 can be met.

In the rotating shaft mechanism 300 provided in this embodiment, the conical spring 3 is mounted between the shaft cover 1 and the first support 7. This makes full use of space between the shaft cover 1 and the first support 7, so that the rotating shaft mechanism has a compact structure.

Figure 7:
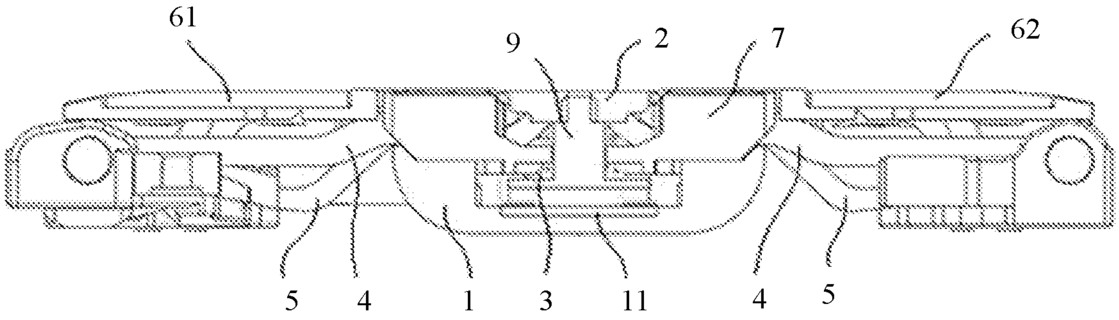
FIG. 7 is a sectional view taken along A-A in FIG. 5.

To improve stability and directivity of reciprocal floating of the floating plate 2, the connecting pin 9 in this embodiment may further include a guide shaft segment, which is configured to cooperate with a channel on the first support 7 to slide. That is, the guide shaft segment is mounted in cooperation with a channel on the first support 7, and both can guide movement of the floating plate 2. FIG. 5 to FIG. 7 show that the guide shaft segment is specifically a cylinder, and the channel on the first support 7 is specifically a circular hole in terms of structure. Certainly, an outer contour of a cross section of the guide shaft segment may be in another form, provided that the foregoing guide effect can be achieved. Refer to FIG. 5 to FIG. 7. The connecting pin 9 may include three shaft segments that are connected in sequence and whose diameters are successively reduced: a first end-part shaft segment 91, a guide shaft segment 92, and a second end-part shaft segment 93. In this embodiment, the connecting pin 9 includes only three cylindrical segments, and therefore has a simple structure and is easy to process. Certainly, the structure of the connecting pin 9 is not limited to the description in this specification.

Certainly, the elastic support member that achieves the foregoing technical effect is not limited to the conical spring 3, but may be alternatively another type of spring, for example, a helical spring that includes at least two cylindrical segments, where two adjacent cylindrical segments are not equal in diameter; and when in compression, a cylindrical segment with a smaller diameter may be located in an inner cavity of a cylindrical segment with a larger diameter. Other forms of the elastic support member are not enumerated in this specification, provided that at least a part of the first part of the elastic support member can be compressed into an inner space of the second part during compression. In this way, the space occupied by the elastic support member in the floating direction is small during compression.

As described above, when the elastic support member such as the conical spring 3 is compressed and deformed, at least a part of the first part of the coils is squeezed into the second part of the coils adjacent to the first part of the coils. In this way, a radial size of the second part of the coils becomes larger. Theoretically, the greater the radial size change of the coil located at the outermost layer of the conical spring 3, the more coils are compressed into its interior, so that the space occupied by the compressed height of the conical spring 3 is correspondingly smaller. However, the larger the radial size change of the coil, the greater the risk of an elastic failure of the coil. That is, if the radius of the coil changes excessively, plastic deformation may occur and the coil cannot be restored to the original state.

Therefore, in this embodiment, a limiting structure is disposed on at least one of a surface of the first end of the connecting member and a surface of the first support 7 that are opposite to each other, to limit a maximum radial size of the elastic support member in a compressed state to a predetermined range. That is, the limiting structure restricts the maximum size in the radial direction when the elastic support member is compressed. In this way, with the limiting structure, the radial size of the elastic support member can be limited to a predetermined range, so as to avoid excessive deformation of the elastic support member in the radial direction, and improve working reliability of the elastic support member.

In this embodiment, the limiting structure may be a groove structure, or may be a protrusion structure. Refer to FIG. 7. FIG. 7 shows that a limiting protrusion 731 is disposed on a surface that is of the first support 7 and that is opposite to a first end of the connecting pin 9, that is, the limiting protrusion 731 is disposed on the bottom wall of the first support 7, and the limiting protrusion protrudes toward the shaft cover 1. In this way, the conical spring 3 is deformed in an inner space enclosed by the limiting protrusion 731. The limiting protrusion 731 may be a 360-degree arc structure, or may be an arc-shaped segment, or certainly may be a plurality of discrete protrusions, and the plurality of protrusions enclose to form a space restricting deformation of the conical spring 3.

To obtain a foldable mobile terminal in the unfolded state with a thickness as small as possible, in this embodiment, a groove 11 is disposed on a surface that is of the shaft cover 1 and that faces the connecting member; and provided that a strength requirement of the shaft cover 1 is met, the groove 11 is disposed at a position opposite to a first end of the shaft cover 1, as shown in FIG. 7. When the foldable mobile terminal is in a folded state, the first end of the connecting member may move to the inside of the groove 11. In this way, in a case in which the shaft cover 1 and the first support 7 form a cavity as small as possible, a moving space requirement of the floating plate 2 is met. When the rotating shaft mechanism 300 is in a folded state, under the action of a restoring force of the elastic support member, a first end of the connecting member abuts against and is contact with the bottom wall of the groove, or a floating plate 2 abuts against the first support 7. That is, regardless of a state of the rotating shaft mechanism 300, the elastic support member can always be in a tensioned state. Under the action of a tensioning force of the elastic support member, the floating plate 2 may abut against the first support 7 or indirectly abut against the shaft cover 1 (the connecting pin 9 abuts against the shaft cover 1), so as to avoid shaking of the floating plate 2, and ensure high mounting stability of the floating plate 2.

In the conventional technology, the main swing arm 4 is mounted on both ends of the shaft cover 1. To avoid interference between the main swing arm 4 and the floating plate 2, the floating plate 2 is not disposed at a position in which the main swing arm 4 is disposed, and the floating plate 2 is located between the two main swing arms 4, that is, a length of the floating plate 2 is less than a length of the shaft cover 1. In this embodiment, the floating plate 2 extends from one end of the shaft cover 1 to the other end of the shaft cover 1, that is, the length of the floating plate 2 is approximately equal to the length of the shaft cover 1, or the length of the floating plate 2 is slightly less than the length of the shaft cover 1. To improve stability of reciprocal movement of the floating plate 2 as much as possible, the floating plate 2 may be further disposed as described below.

Figure 9:
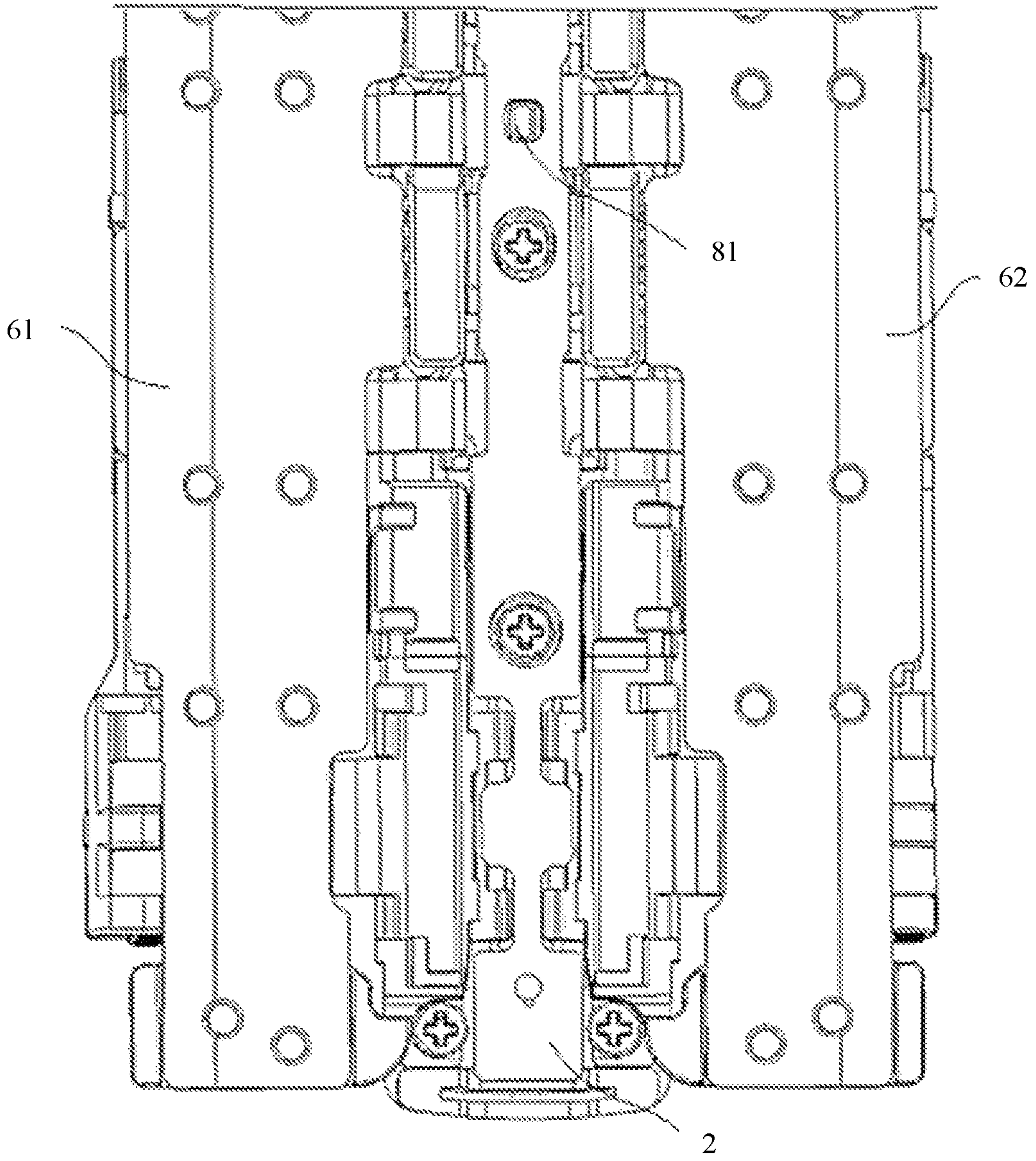
FIG. 9 is a partial schematic diagram of the rotating shaft mechanism shown in FIG. 5.

In this embodiment, at least one second support 8 may be further disposed between the two first supports 7. FIG. 8 and FIG. 9 show a disposing position of the second support 8 in an example, and a first guide component is disposed on the second support 8, and is configured to cooperate with the second guide component disposed on the floating plate 2 to provide floating guide. In a floating process of the floating plate 2, the first guide component cooperates with the second guide component to guide movement of the floating plate 2.

Figure 10:
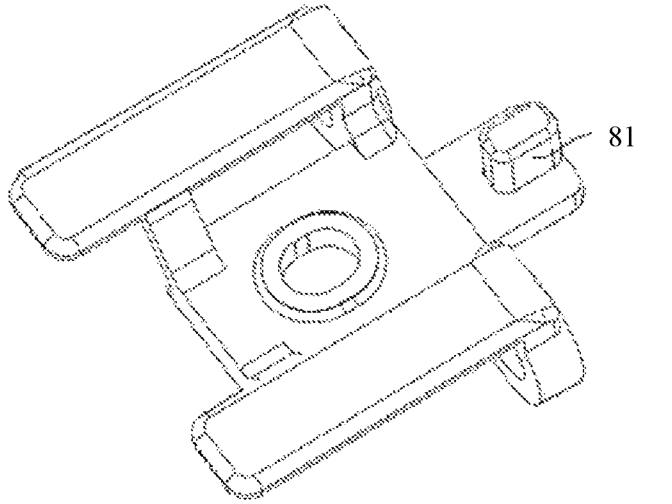
FIG. 10 is a schematic diagram of a structure of a second support according to an embodiment of this application.

The first guide component and the second guide component cooperate with each other, provided that motion guidance can be implemented. In an example, one of the first guide component and the second guide component may be a guide post, and the other is a guide hole that cooperates with the guide post to slide. The guide post and the guide hole have a simple cooperation structure, and a space occupied is small. This helps meet the ultra-thin design requirement of the foldable mobile terminal. Refer to FIG. 10. In an example, a guide post 81 protruding toward the floating plate 2 is disposed in the second support 8, and a guide hole is disposed on the floating plate 2.

In this embodiment, the second support 8 can not only connect to the auxiliary swing arm 5, but also guide the floating plate 2.

As described above, when the swing arm assembly is unfolded around the main shaft body, the swing arm assembly drives the floating plate 2 to move toward the flexible display 100; and when the swing arm assembly is in the unfolded state, the floating plate 2 is also supported in a screen supporting position by the swing arm assembly. In this embodiment, the swing arm assembly includes a main swing arm 4 and an auxiliary swing arm 5. In the unfolded state, the floating plate 2 may be supported on both the main swing arm 4 and the auxiliary swing arm 5, or the floating plate 2 is supported on only one of the main swing arm 4 or the auxiliary swing arm 5. A structure of the floating plate 2 in the unfolded state is not described in detail in this application.

In this embodiment, the connecting member fixedly connected to the floating plate 2 is not limited to the structure of the connecting pin 9, and may be in another form, for example, a bolt or a screw.

In an example, the first support 7 may include a first connector 71 and a second connector 72; the first connector 71 and the second connector 72 each are connected to a support part 73 on a side that is close to the shaft cover 1; the first connector 71, the second connector 72, and each support part 73 form an accommodating groove that extends in a length direction of the main shaft body, some segments of the floating plate 2 are floating reciprocally in the accommodating groove, the second end of the connecting member is connected to the floating plate through the support part, and the elastic support member can be compressed between the connector and the support part; and both the first connector and the second connector have a top surface to support the flexible display that is in an unfolded state. The swing arm assembly may be rotatably connected to the first connector 71 and the second connector 72. For a support surface that is of the flexible display 100 and that is a horizontal surface, when the rotating shaft mechanism is in the unfolded state, top surfaces of the first connector 71, the second connector 72, and the floating plate 2 that face the flexible display 100 are coplanar. In this way, a bending part of the flexible display 100 in the unfolded state can be supported on the top surfaces of the first connector 71, the second connector 72, and the floating plate 2, so that a supporting area is large and the bending part of the flexible display 100 is evenly stressed.

Structures of the first support 7 and the second support 8 are not limited to the descriptions in this specification, but may be another structure, provided that the foregoing use requirement is met.

In this embodiment, only an example in which the main shaft body includes the shaft cover 1, the first support 7, and the second support 8 is described. A person skilled in the art should understand that the main shaft body in this application mainly provides a mounting base for other components, and is not limited to including the foregoing components.

A specific example is used in this specification to describe principles and implementations of the utility model. The foregoing embodiments are merely used to help understand the method and the core idea of the utility model. It should be noted that a person of ordinary skill in the art may make several improvements or modifications to the utility model without departing from the principles of the utility model, and these improvements or modifications shall fall within the protection scope of the claims of the utility model.

What is claimed is:

1. A foldable mobile terminal comprising a rotating shaft mechanism, wherein the rotating shaft mechanism comprises:

a main shaft body, comprising a shaft cover and first supports; the shaft cover is fixedly connected to at least the first supports at two ends in a length direction of the shaft cover, and there is a cavity between the shaft cover and each of the first supports;

a floating plate, the floating plate is disposed at one side of the first support away from the shaft cover and extends from one end of the shaft cover to the other end of the shaft cover along an axial direction of the main shaft body;

a connecting member, a first end of the connecting member is located in the cavity, a second end of the connecting member passes through a channel on the first support to connect the floating plate, wherein the first end and the second end are disposed along a thickness direction of the rotating shaft mechanism;

an elastic support member, located in the cavity, the elastic support member is compressed between the first end of the connecting member and the first support when the foldable mobile terminal is in a flattened state;

the shaft cover is provided with a groove, when the rotating shaft mechanism is in a folded state, under an action of a restoring force of the elastic support member, a first end of the connecting member abuts against a bottom of the groove or the floating plate abuts against the first support; and the first end of the connecting member comprises a support surface facing the first support, a lower end of the elastic support member is supported on the support surface, and an upper end of the elastic support member abuts against a bottom wall of the first support.

2. The foldable mobile terminal according to claim 1, wherein the connecting member further comprises a guide shaft segment that cooperates with the channel on the first support to slide, and the guide shaft segment is connected between the first end and the second end.

3. The foldable mobile terminal according to claim 1, the shaft cover is provided with a groove with an opening facing the connecting member.

4. The foldable mobile terminal according to claim 1, wherein the main shaft body further comprises at least one second support fastened to the shaft cover, the second support is located between the two first supports.

5. The foldable mobile terminal according to claim 4, wherein a first guide component is disposed on the second support, and is configured to cooperate with a second guide component disposed on the floating plate to provide floating guide.

6. The foldable mobile terminal according to claim 1, wherein the rotating shaft mechanism further comprises a swing arm assembly, wherein both sides of the main shaft body are rotatably connected to at least one swing arm assembly, a rotating shaft of each swing arm assembly is parallel to a length direction of the main shaft body, the swing arm assemblies drive the floating plate to move when being unfolded around the main shaft body, and the swing arm assemblies can support the floating plate in the screen supporting position.

7. The foldable mobile terminal according to claim 6, wherein each swing arm assembly comprises a main swing arm, an inner end of the main swing arm is rotatably connected to the first support, an outer end of the main swing arm is hinged or pivotally connected to a connecting plate, the connecting plate is configured to move reciprocally between a folding position and an unfolding position with the main swing arm.

8. The foldable mobile terminal according to claim 7, wherein an inner end of the main swing arm includes a semi-circular arc-shaped segment, and the semi-circular arc-shaped segment rotates and cooperates with an arc-shaped surface of the first support.

9. The foldable mobile terminal according to claim 7, wherein the length of the floating plate is equal to the length of the connecting plate along the axial direction of the main shaft body.

10. The foldable mobile terminal according to claim 1, wherein the floating plate is provided with a wide section and a narrow section along the axial direction of the main shaft body.

11. The foldable mobile terminal according to claim 7, wherein the main shaft body further comprises at least one second support fastened to the shaft cover the second support is located between the two first supports; the first support and the second support are located at the opening position of the shaft cover; and each swing arm assembly further comprises an auxiliary swing arm, the inner end of the auxiliary swing arm is rotatably connected with the second support, and the outer end of the auxiliary swing arm is slidably connected with the connecting plate; when the main swing arm and the auxiliary swing arm are unfolded around the main shaft body, the floating plate is supported on both the main swing arm and the auxiliary swing arm, or the floating plate is supported on only one of the main swing arm or the auxiliary swing arm.

12. The foldable mobile terminal according to claim 11, wherein a sliding groove is disposed on a side surface of the connecting plate that faces the auxiliary swing arm, and a part of the auxiliary swing arm is slidably disposed in the sliding groove.

13. The foldable mobile terminal according to claim 1, wherein the first support comprises a first connector and a second connector; the first connector and the second connector each are connected to a support part on a side that is close to the connecting member; the first connector, the second connector, and each support part form an accommodating groove that extends in a length direction of the main shaft body.

14. The foldable mobile terminal according to claim 13, wherein the first connector and the second connector each have a top surface to support the flexible display that is in an unfolded state.

15. The foldable mobile terminal according to claim 1, comprising a flexible display, the flexible display comprises a bending part, at least a part of the bending part is opposite to the main shaft body.

16. The foldable mobile terminal according to claim 1, wherein the elastic support member includes a conical spring; and when the rotating shaft mechanism is in the unfolded state, a part of a helical segment of the conical spring is located in an inner cavity enclosed by another part of the helical segment.

17. The foldable mobile terminal according to claim 1, wherein a limiting structure is disposed on at least one of a surface of the first end of the connecting member and a surface of the first support that are opposite to each other, and is configured to limit a maximum radial size of the elastic support member in a compressed state to a predetermined range.

18. The foldable mobile terminal according to claim 17, wherein the limiting structure is a groove structure or a protrusion structure.

19. The foldable mobile terminal according to claim 5, wherein one of the first guide component and the second guide component is a guide post, and the other is a guide hole that cooperates with the guide post to slide.

20. The foldable mobile terminal according to claim 7, wherein the two ends of the floating plate are respectively aligned with the two ends of the connecting plate along the axial direction of the main shaft body.

* * * * *